US009580594B2

(12) United States Patent
Bhattacharjee et al.

(10) Patent No.: US 9,580,594 B2
(45) Date of Patent: Feb. 28, 2017

(54) FDCA-BASED POLYESTERS

(71) Applicant: Dow Global Technologies LLC, Midland, MI (US)

(72) Inventors: Debkumar Bhattacharjee, Blue Bell, PA (US); Kalyan Sehanobish, Sanford, MI (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 14/653,599

(22) PCT Filed: Dec. 18, 2013

(86) PCT No.: PCT/US2013/076263
§ 371 (c)(1),
(2) Date: Jun. 18, 2015

(87) PCT Pub. No.: WO2014/100256
PCT Pub. Date: Jun. 26, 2014

(65) Prior Publication Data
US 2015/0307704 A1    Oct. 29, 2015

Related U.S. Application Data

(60) Provisional application No. 61/740,084, filed on Dec. 20, 2012.

(51) Int. Cl.
| | |
|---|---|
| *C08L 67/02* | (2006.01) |
| *C08J 5/18* | (2006.01) |
| *C08G 63/181* | (2006.01) |
| *C08G 63/199* | (2006.01) |
| *B29C 47/00* | (2006.01) |
| *B29C 47/88* | (2006.01) |
| *C08G 63/16* | (2006.01) |
| *B29K 67/00* | (2006.01) |
| *B29L 7/00* | (2006.01) |

(52) U.S. Cl.
CPC .......... *C08L 67/02* (2013.01); *B29C 47/0004* (2013.01); *B29C 47/0021* (2013.01); *B29C 47/0057* (2013.01); *B29C 47/8815* (2013.01); *C08G 63/16* (2013.01); *C08G 63/181* (2013.01); *C08G 63/199* (2013.01); *C08J 5/18* (2013.01); *B29K 2067/00* (2013.01); *B29K 2995/0067* (2013.01); *B29L 2007/008* (2013.01); *C08J 2367/02* (2013.01); *C08J 2467/02* (2013.01); *C08L 2203/16* (2013.01); *C08L 2205/025* (2013.01)

(58) Field of Classification Search
CPC .............. C08L 67/02; C08L 2203/16; C08L 2205/025; C08G 63/16; C08G 63/181; C08G 63/199; B29C 47/0004; B29C 47/0057; B29C 47/8815; B29K 2995/0067; B29K 2067/00; B29L 2007/008; C08J 5/18; C08J 2367/02
See application file for complete search history.

(56) References Cited

U.S. PATENT DOCUMENTS

| | | | |
|---|---|---|---|
| 5,562,984 A | 10/1996 | Mortlock et al. | |
| 5,958,581 A | 9/1999 | Khanarian et al. | |
| 6,063,464 A | 5/2000 | Charbonneau et al. | |
| 6,342,300 B1 | 1/2002 | Bengs et al. | |
| 8,083,064 B2 | 12/2011 | Boswell et al. | |
| 2002/0115817 A1 | 8/2002 | Hayes | |
| 2006/0009611 A1 | 1/2006 | Hayes | |
| 2007/0100122 A1 | 5/2007 | Crawford et al. | |
| 2009/0018264 A1 | 1/2009 | Fuseya | |
| 2010/0076133 A1* | 3/2010 | Yamaguchi ............... | C08K 3/34 524/188 |
| 2010/0143709 A1 | 6/2010 | Baer et al. | |
| 2011/0039999 A1* | 2/2011 | Witt ................... | C08G 18/4219 524/210 |
| 2011/0071238 A1 | 3/2011 | Bastioli et al. | |
| 2011/0282020 A1 | 11/2011 | Sipos | |
| 2012/0264047 A1 | 10/2012 | Farrugia et al. | |
| 2013/0095263 A1* | 4/2013 | Carman, Jr. ......... | C08G 63/199 428/35.7 |

FOREIGN PATENT DOCUMENTS

| | | |
|---|---|---|
| CN | 102718955 A | 10/2012 |
| EP | 1535943 A1 | 6/2005 |
| EP | 1752482 A1 | 2/2007 |
| GB | 1164374 A | 9/1969 |
| JP | 2005325170 A | 11/2005 |
| JP | 2006028324 A | 2/2006 |
| JP | 2006096845 A | 4/2006 |

(Continued)

OTHER PUBLICATIONS

Argyropoulos, J., et al.; Unoxol® Diol: A New Liquid Cycloaliphatic Diol for Coatings Applications, 2006, p. 1-5.*
Chanda, M., et al.; Plastics Technology Handbook, 2007, p. 2-29-2-32.*
Khrouf, A. et al A detailed investigation of the polytransesterification of difuranic diesters with different diols, Macromol Chem. Phys., 1998, 2755-2765, 199.
Gomes. M, et al "Synthesis and Characterization of poly(2,5-furan dicarboxylate) based on a variety of diols", J. Polym Sci Part A: Polym Chem 2011, 3759-3768, 49 published online Jun. 20, 2011 in Wiley Online Library (wileyonlinelibrary.com).
Fox, T., Bull. Am. Physics Soc., 1956 vol. 1(3), p. 123.
Okada, M, et al.,"Structure-biodegradability relationship of polyesters containing furan rings", Polymer Preprints, American Chemical Society, US, No. 2, Jan. 1, 1998, pp. 152-153 vol. 39.
PCT/US2013/076263, International Search Report and Written Opinion with a mailing date of Jun. 20, 2014.

(Continued)

Primary Examiner — Robert Jones, Jr.

(57) ABSTRACT

A polymer comprising reaction product of (a) one or more diacid or diester thereof, and (b) one or more polyol, wherein component (a) comprises 5 to 100 mole %, based on the total amount of component (a), of 2,5-furan dicarboxylic acid (FDCA), or one or more C1 to C10 alkyl diester thereof, and component (b) comprises a mixture of 1,3-cyclohexanedimethanol and 1,4-cyclohexanedimethanol, or 2,2,4,4-tetramethyl-1,3-cyclobutanediol, or combinations thereof.

14 Claims, No Drawings

(56) References Cited

FOREIGN PATENT DOCUMENTS

WO      2010140599 A1    12/2010

OTHER PUBLICATIONS

PCT/US2013/076263, International Preliminary Report on Patentability with a mailing date of Jul. 2, 2015.

* cited by examiner

FDCA-BASED POLYESTERS

FIELD OF THE INVENTION

This invention relates to polyester polymers comprising the reaction products of (a) 2,5-furan dicarboxylic acid, or one or more of its $C_1$ to $C_{10}$ alkyl diesters, and optionally other diacids, and (b) a mixture of 1,3-cyclohexanedimethanol and 1,4-cyclohexanedimethanol, or 2,2,4,4-tetramethyl-1,3-cyclobutanediol, or combinations thereof. The invention further relates to compositions which comprise blends of such polymer, and articles, such as single- and multi-layer films, made with such polymers.

BACKGROUND

Polyethylene terephthalate (PET) is widely used in both flexible and rigid packaging. There is a need to provide polymer films with improved barrier properties to oxygen, carbon dioxide and moisture to accommodate increasing demands in lighter weighting of bottles, simpler designs, and longer shelf life of packaged food, including produce, meat, fish, and cheese and other dairy products. In addition, with the emphasis on technologies based on sustainable chemistry, there has been increased interest in films based on monomers from renewable sources, such as polyethylene furanoate based on furan dicarboxylic acid, which can be produced using bioderived compounds, such as fructose.

Several new polymers with high barrier properties have been developed from either renewable or non-renewable resources and some of these have already been commercialized. These include polyethylene naphthalate (PEN), polyglycolic acid (PGA), and polyethylene furanoate (PEF). For those polymers, the oxygen barrier property (at about 23° C. and 50% relative humidity) follows the order:

PGA≈EVOH>PEN≈PEF>PET

Compared to PET, PEF has been reported to have six times improved oxygen barrier, two times improved barrier to carbon dioxide, and also improved moisture barrier. "Bioplastics, Reshaping the Industry", Las Vegas, Feb. 3, 2011.

In WO 2010/0177133 (Sipos, assigned to Furanix Technologies B.V.), a process for the production of PEF polymers and copolymers made from 2,5-furandicarboxylate is disclosed. The (co)polymers have a number average molecular weight of at least 10,000 (as determined by GPC based on polystyrene standards), and an absorbance below 0.05 (as a 5 mg/ml solution in a dichlomethane:hexafluoroisopropanol 8:2 mixture at 400 nm). These (co)polymers may be subjected to solid state polycondensation and then attain a number average molecular weight greater than 20,000 (as determined by GPC based on polystyrene standards), without suffering from discoloration.

There remains a need for novel polymers which can be used to form films in a cost-effective manner that exhibit a desirable balance of properties, such as improved oxygen, carbon dioxide, and water-vapor permeabilities, higher glass transition temperature (Tg), and improved toughness, chemical, heat and impact resistance. There is, further, a need for novel polymers which can used to form films with high-temperature heat sealability using alternative sealing technologies.

The present invention achieves these objectives by forming a film from (a) 2,5-furan dicarboxylic acid or its diester, dimethyl 2,5-furan dicarboxylate, alone or as one of the major components in combination with other diacids or diesters, and (b) a mixture of 1,3-cyclohexanedimethanol and 1,4-cyclohexanedimethanol, or 2,2,4,4-tetramethyl-1,3-cyclobutanediol, or combinations thereof, by esterification or trans-esterification, respectively, in presence of suitable catalysts, followed by further polycondensation at higher temperature and optionally at reduced pressure, and using solid state polymerization to increase the molecular weight.

SUMMARY OF THE INVENTION

The present invention relates to polymers comprising reaction product of (a) one or more diacid or diester thereof, and (b) one or more polyol, wherein component (a) comprises 5 to 100 mole %, based on the total amount of component (a), of 2,5-furan dicarboxylic acid (FDCA), or one or more $C_1$ to $C_{10}$ alkyl diester thereof, and component (b) comprises a mixture of 1,3-cyclohexanedimethanol and 1,4-cyclohexanedimethanol, or 2,2,4,4-tetramethyl-1,3-cyclobutanediol, or combinations thereof. One suitable diester is dimethyl furanoate (DMF).

When component (a) (diacid or diester) is less than 100 mole % FDCA or DMF, the polymer may be formed from FDCA or DMF and 0.1 to 95 mole %, based on the total amount of component (a), of 2,6-naphthalene dicarboxylic acid (NDCA) or one or more $C_1$ to $C_{10}$ alkyl diester thereof. One suitable diester of NDCA is dimethyl naphthanoate (DMN). For example, the polymer may be formed from diacids comprising 10 to 90 mole % of FDCA and 10 to 90 mole % of NDCA, based on the total amount of component (a). As another example, the polymer may be formed from diesters comprising 10 to 90 mole % of one or more $C_1$ to $C_{10}$ alkyl diester of FDCA, such as DMF, and 10 to 90 mole % of one or more $C_1$ to $C_{10}$ alkyl diester of NDCA, such as DMN, based on the total amount of component (a).

The polyol, component (b), comprises a mixture of 1,3-cyclohexanedimethanol and 1,4-cyclohexanedimethanol, or 2,2,4,4-tetramethyl-1,3-cyclobutanediol, or combinations thereof. Component (b) may further comprise 10-90 mole %, based on the total amount of component (b) polyol, of ethylene glycol.

When component (b) comprises a mixture of 1,3- and 1,4-cyclohexanedimethanol, it may comprise 25 to 75 mole %, based on the total amount of component (b), of 1,3-cyclohexanedimethanol and 25 to 75 mole %, based on the total amount of component (b), of 1,4-cyclohexanedimethanol. As an example, component (b) may comprise 45 to 65 mole %, based on the total amount of component (b), of 1,3-cyclohexanedimethanol and 35 to 55 mole %, based on the total amount of component (b), of 1,4-cyclohexanedimethanol. As a further example, component (b) may comprise 55 mole %, based on the total amount of component (b), of 1,3-cyclohexanedimethanol and 45 mole %, based on the total amount of component (b), of 1,4-cyclohexanedimethanol.

Component (b) may comprise 2,2,4,4-tetramethyl-1,3-cyclobutanediol alone, or in combination with 1,3- and 1,4-cyclohexanedimethanol or ethylene glycol or other polyols.

The invention further includes compositions comprising (1) a first polymer comprising reaction product of (a) one or more diacid or diester thereof, and (b) one or more polyol, wherein component (a) comprises 5 to 100 mole %, based on the total amount of component (a), of FDCA, or one or more $C_1$ to $C_{10}$ alkyl diester thereof, and component (b) comprises a mixture of 1,3-cyclohexanedimethanol and 1,4-cyclohexanedimethanol, or 2,2,4,4-tetramethyl-1,3-cyclobutanediol, or combinations thereof; and (2) and one or more second polymer selected from the group consisting of polymers of (1) above different from the first polymer and other polyesters which are reaction product of (i) acids or esters and (ii) polyols, wherein (x) the acids and esters do not include FDCA, $C_1$ to $C_{10}$ alkyl diester thereof, or combinations thereof, when the polyol is a mixture of 1,3-cyclohexanedimethanol and 1,4-cyclohexanedimethanol, or 2,2,4,4-tetramethyl-1,3-cyclobutanediol, or combinations thereof, and (y) wherein the polyols do not include a mixture of 1,3-cyclohexanedimethanol and 1,4-cyclohexanedimethanol, or 2,2,4,4-tetramethyl-1,3-cyclobutanediol, or combinations thereof when the acids and esters are selected from the group consisting of FDCA, $C_1$ to $C_{10}$ alkyl diester thereof, or combinations thereof. This composition may comprise two or more polymers, wherein at least one polymer is the reaction product of a diacid and at least one other polymer is the reaction product of a diester.

The composition may comprise one or more other polyester comprising a reaction product of component (i) glycolic acid or glycolide, and component (ii) one or more polyol comprising a mixture of 1,3- and 1,4-cyclohexanedimethanol, or 2,2,4,4-tetramethyl-1,3-cyclobutanediol, or combinations thereof. Since the polyol component contains a mixture of 1,3- and 1,4-cyclohexanedimethanol, or 2,2,4,4-tetramethyl-1,3-cyclobutanediol, it cannot be solely ethylene glycol.

The other polyester may also comprise aliphatic homopolymer polyglycolide or polyglycolic acid (PGA), polylactic acid (PLA), polycaprolactone (PCL), copolymer polyethylene adipate (PEA), polyhydroxyalkanoate (PHA), polyethylene terephthalate (PET), semi-aromatic copolymer PET, polybutylene terephthalate (PBT), polytrimethylene terephthalate (PTT), polyethylene naphthalate (PEN), and aromatic copolymers from polycondensation of 4-hydroxybenzoic acid and 6-hydroxynaphthalene-2-carboxylic acid.

The invention further includes an article comprising one or more polymers or compositions described above. Examples of such articles include, but are not limited to, thermoformed articles, film, shrink label, retortable packaging, pipe, bottle, profile, molded article, extruded article, fiber, and fabric. Rigid or semi-rigid (i.e., somewhat deformable) bottles and various rigid articles may be made using conventional blow-molding processes well-known in the art.

The invention further includes methods of forming films or sheets comprising the steps of (i) extruding a polymer to form an extrudate; (ii) shaping the extrudate by passing it through a flat or annular die; and (iii) cooling the extrudate to form a film or sheet having a machine direction and a cross direction; wherein the polymer comprises reaction product of (a) one or more diacid or diester thereof, and (b) one or more polyol, wherein component (a) comprises 5 to 100 mole %, based on the total amount of component (a), of furan dicarboxylic acid, or one or more $C_1$ to $C_{10}$ alkyl diester thereof, and component (b) comprises a mixture of 1,3-cyclohexanedimethanol and 1,4-cyclohexanedimethanol, or 2,2,4,4-tetramethyl-1,3-cyclobutanediol, or combinations thereof. The method may comprise the further step of orienting the film or sheet in the machine or cross direction, or both.

The invention further includes a film or sheet of one or more layers, wherein at least one layer comprises polymer comprising the reaction product of (a) one or more diacid or diester thereof, and (b) one or more polyol, wherein component (a) comprises 5 to 100 mole %, based on the total amount of component (a), of 2,5-furan dicarboxylic acid, or one or more $C_1$ to $C_{10}$ alkyl diester thereof, and component (b) comprises a mixture of 1,3-cyclohexanedimethanol and 1,4-cyclohexanedimethanol, or 2,2,4,4-tetramethyl-1,3-cyclobutanediol, or combinations thereof.

The invention further comprises a barrier film comprising a polyester-based polymer with (a) an $O_2$ gas permeability 0.4 cc-mil/100 in$^2$ 24 hrs atm (7.9 cc. 20 µ/m$^2$ 24 hrs atm) at 50% relative humidity (ASTM D-3985) or less, (b) a moisture permeability of 0.5 g-mil/100 in$^2$ 24 hrs atm (9.8 g 20 µ/m$^2$ 24 hrs) at 38° C. (ASTM F-1249) or less, and (c) a glass transition temperature of 120° C. or higher. The barrier film may further have (x) a Falling dart drop impact (Type A) of 200 g or greater (ASTM D1709) for a 50 micron thick film material at room temperature and 50% relative humidity, (y) an Elmendorf tear of 400 g or greater (ASTM D-1922 for a 50 micron thick film material) at room temperature and 50% relative humidity, and (z) a notched Izod impact of 2.0 J/cm or greater at room temperature and 50% relative humidity (ASTM D-256 for rigid materials). Preferably, the film has properties (a), (b) and (c), and one or more of properties (x), (y) and (z).

DETAILED DESCRIPTION OF THE INVENTION

The present invention provides cost-effective polymers that exhibit a desirable balance of properties, relative to PEF polymers, including improved oxygen, carbon dioxide, and water-vapor permeability, higher glass transition temperature (Tg), and improved chemical, heat and impact resistance. In addition, these polymers can be used to form films with high-temperature heat sealability using alternative sealing technologies.

The polymers of the present invention comprise the reaction product of (a) one or more diacid or diester thereof, and (b) one or more polyol, wherein component (a) comprises 5 to 100 mole %, based on the total amount of component (a), of 2,5-furan dicarboxylic acid (FDCA), or one or more $C_1$ to $C_{10}$ alkyl diester thereof, and component (b) comprises a mixture of 1,3-cyclohexanedimethanol and 1,4-cyclohexanedimethanol, or 2,2,4,4-tetramethyl-1,3-cyclobutanediol, or combinations thereof. One suitable diester is dimethyl furanoate (DMF). The polymers may be formed from 100% FDCA or DMF and some amount of a mixture of 1,3- and 1,4-cyclohexanedimethanol, or 2,2,4,4-tetramethyl-1,3-cyclobutanediol, or combinations thereof.

It can be desirable to prepare polymers with FDCA or DMF and other diacids or diesters. When component (a) (diacid or diester) is less than 100 mole % FDCA or DMF, the polymer may be formed from FDCA or DMF and 0.1 to 95 mole %, based on the total amount of component (a), of 2,6-naphthalene dicarboxylic acid (NDCA) or one or more $C_1$ to $C_{10}$ alkyl diester thereof. One suitable diester of NDCA is dimethyl naphthanoate (DMN). For example, the polymer may be formed from diacids comprising 10 to 90 mole % of FDCA and 10 to 90 mole % of NDCA, based on the total amount of component (a). As another example, the polymer may be formed from diesters comprising 10 to 90 mole % of one or more $C_1$ to $C_{10}$ alkyl diester of FDCA, such as DMF, and 10 to 90 mole % of one or more $C_1$ to $C_{10}$ alkyl diester of NDCA, such as DMN, based on the total amount of component (a).

Preferably, the component (a) diacid(s) or diester(s) is made up exclusively of diacid(s) or diester(s), respectively. These may be combinations of FDCA and only other diacids, or DMF and only other diesters. However, component (a) may also comprise a mixture of diacid(s) and diester(s). When component (a) has a mixture of diacid(s) and diester(s), the alternate (non-predominant) form is preferably present at relatively low amounts, for example, 20 or 10, or 5, or 1, or 0.5, or 0.1 mole % based on the total amount of component (a). For example, component (a) may comprise 90 mole % DMN and 10 mole % NDCA. As component (a) may comprise a mixture of diacids or diesters, the alternate form diester(s) or diacid(s), respectively, may also be a mixture and are not necessarily the counterpart diacid or diester. For example, component (a) may comprise a predominant amount of DMN and DMF with a smaller amount of FDCA; or as another example, component (a) may comprise a predominant amount of DMF with a smaller amount of NDCA.

The terms "FDCA-based polymer" and "FDCA/NDCA-based polymer" refer to polymers made from either the diacids or the diesters, and refer to polymers made from FDCA itself or DMF or other diesters of FDCA and other diacids or diesters as described herein (not just NDCA or DMN). As described herein, such FDCA-based polymers and FDCA/NDCA-based polymers may comprise residues of other diacids and diesters as well.

The polyol, component (b), comprises a mixture of 1,3-cyclohexanedimethanol and 1,4-cyclohexanedimethanol, or 2,2,4,4-tetramethyl-1,3-cyclobutanediol, or combinations thereof. Component (b) may further comprise 10 to 90 mole %, based on the total amount of component (b) polyol, of ethylene glycol. Component (b) may also comprise other polyols based on cyclic, acyclic or aromatic alcohols.

When component (b) comprises a mixture of 1,3- and 1,4-cyclohexanedimethanol, it may comprise 25 to 75 mole %, based on the total amount of component (b), of 1,3-cyclohexanedimethanol and 25 to 75 mole %, based on the total amount of component (b), of 1,4-cyclohexanedimethanol. As an example, component (b) may comprise 45 to 65 mole %, based on the total amount of component (b), of 1,3-cyclohexanedimethanol and 35 to 55 mole %, based on the total amount of component (b), of 1,4-cyclohexanedimethanol. As a further example, component (b) may comprise 55 mole %, based on the total amount of component (b), of 1,3-cyclohexanedimethanol and 45 mole %, based on the total amount of component (b), of 1,4-cyclohexanedimethanol.

Component (b) may comprise 2,2,4,4-tetramethyl-1,3-cyclobutanediol alone, or in combination with 1,3- and 1,4-cyclohexanedimethanol or ethylene glycol or other polyols.

The polymers of the present invention have a glass transition temperature (Tg) of at least 100° C. as measured by differential scanning calorimetry (DSC) or calculated according to the Fox Equation (see, T. G. Fox, Bull. Am. Physics Soc., vol. 1(3), p. 123 (1956)). Preferably, the Tg of the polymers is in the range from 100 to 150° C., or 110 to 150° C., or 120 to 150° C. Polymers with Tg of 100° C. or higher, and preferably 120° C. or higher, and the films, sheets and articles made from them, exhibit desirable physical characteristics as described elsewhere herein.

The polymers and copolymers described above may be prepared by known methods. WO 2010/0177133, referenced above, teaches methods to make these polyesters, and produce them at high molecular weights and without discoloration. The method of WO 2010/0177133 is applicable to preparing the present polymers using FDCA or DMF alone or together with suitable amounts of NDCA or DMN or $C_2$ to $C_{10}$ alkyl diesters of NDCA.

For example, the polymers of the present invention may be made by a two-step process, wherein first, in Step (I), a prepolymer is made having furan dicarboxylate and/or naphthalene dicarboxylate moieties within the polymer backbone. This intermediate product is preferably an ester composed of two diol monomers and one diacid monomer, wherein at least part of the diacid monomers comprises FDCA or FDCA and NDCA, followed by a melt-polymerization of the prepolymers under suitable polymerization conditions. Such conditions typically involve reduced pressure to remove the excess of diol monomers. Using DMF as an example of the diester, in Step (I) DMF is reacted in a catalyzed transesterification process with about 2 equivalents of a diol, to generate the prepolymer while removing 2 equivalents of the corresponding alcohol. DMF is preferred, since this transesterification step then generates methanol, a volatile alcohol that is easy to remove. However, as starting material diesters of FDCA with other volatile alcohols or phenols (e.g., having a boiling point at atmospheric pressure of less than 150° C., preferably less than 100° C., more preferably of less than 80° C.) may be used as well. Examples, therefore, include ethanol, methanol and a mixture of ethanol and methanol. The reaction leads to formation of a polyester. As discussed in more detail below, the diol monomers may contain additional hydroxyl groups, such as glycerol, pentaerythritol or sugar alcohols.

Step (I) is commonly referred to as esterification when acid is used, and trans-esterification when ester is used, with concomitant removal of water or an alcohol, respectively. Step (II) of the process is a catalyzed polycondensation step, wherein the prepolymer is polycondensed under reduced pressure, at an elevated temperature and in the presence of a suitable catalyst.

The first step, transesterification, is catalyzed by a specific transesterification catalyst at a temperature preferably in the range of about 150 to about 220° C., more preferably in the range of about 180 to about 200° C., and carried out until the starting ester content is reduced until it reaches the range of about 3 mole % to about 1 mole %. The transesterification catalyst may be removed, to avoid interaction in the second step of polycondensation, but often remains present for the second step. The selection of the transesterification catalyst can be affected by the selection of the catalyst used in the polycondensation step, and vice versa.

Suitable catalysts for use in the Step (I) transesterification process include tin(IV) based catalysts, preferably organotin (IV) based catalysts, more preferably alkyltin(IV) salts including monoalkyltin(IV) salts, dialkyl and trialkyltin(IV) salts and mixtures thereof. The tin(IV) based catalysts are better than tin(II) based catalysts, such as tin(II) octoate.

The tin(IV) based catalysts may also be used with alternative or additional transesterification catalysts. Examples of alternative or additional transesterification catalysts that may be used in Step (I) include one or more of titanium(IV) alkoxides or titanium(IV) chelates, zirconium(IV) chelates, or zirconium(IV) salts (e.g. alkoxides); hafnium(IV) chelates or hafnium(IV) salts (e.g. alkoxides). Although these alternative or additional catalysts may be suitable for the transesterification, they may actually interfere during the polycondensation step. Therefore, preferably, the main or sole transesterification catalyst is a tin(IV) based catalyst. Alternatively, when alternative or additional catalysts are used, they are removed after Step (I) and before Step (II).

Preferred transesterification catalysts are selected from one or more of, butyltin(IV) tris(octoate), dibutyltin(IV) di(octoate), dibutyltin(IV) diacetate, dibutyltin(IV) laureate, bis(dibutylchlorotin(IV)) oxide, dibutyltin dichloride, tributyltin(IV) benzoate and dibutyltin oxide.

In respect to the catalyst, it should be realized that the active catalyst as present during the reaction may be different from the catalyst as added to the reaction mixture. The catalysts are used in an amount of about 0.01 to about 0.2 mole % relative to initial diester, more preferably in an amount of about 0.04 to about 0.16 mole % of initial diester.

The intermediate product (i.e., the prepolymer) may, but importantly need not be isolated and/or purified. Preferably, the product is used as such in the subsequent polycondensation step. In this catalyzed polycondensation step, the prepolymer is polycondensed under reduced pressure, at an elevated temperature and in the presence of a suitable catalyst. The temperature is preferably in the range of about the melting point of the polymer to about 30° C. above this melting point, but preferably not less than about 180° C. The pressure should be reduced, preferably gradually at stages. It should preferably be reduced to as low as a pressure as possible, more preferably below 1 mbar. Step (II) is catalyzed by specific polycondensation catalysts and the reaction is carried out at mild melt conditions.

Examples of suitable polycondensation catalysts for use in Step (II) include tin(II) salts, such as tin(II) oxide, tin(II) dioctoate, butyltin(II) octoate, or tin(II) oxalate. Preferred catalysts are tin(II) salts obtained by the reduction of the tin(IV) catalyst, e.g., alkyltin(IV), dialkyltin(IV), or trialkyltin(IV) salts, used as transesterification catalyst in Step (I), with a reducing compound. Reducing compounds used may be well-known reducing compounds, preferably phosphorus compounds.

Particularly preferred reducing compounds are organophosphorus compounds of trivalent phosphorus, in particular a monoalkyl or dialkyl phosphinate, a phosphonite or a phosphite. Examples of suitable phosphorus compounds are triphenyl phosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, di(2,4-di-tert-butylphenyl) pentaerythritol diphosphite, tristearylsorbitol triphosphite, tetrakis(2,4-di-tert-butylphenyl) 4,4'-diphenylenediphosphonite, 4,4'-isopropylidenediphenol $C_{12\text{-}15}$ alkyl phosphite, poly(dipropylene glycol) phenyl phosphite, tetraphenyl dipropylene glycol phosphite, tetraphenyl diisopropylene glycol phosphite, trisisodecyl phosphite, diisodecyi-phenyl phosphite, diphenyl isodecyl phosphite, and mixtures thereof.

The preferred polycondensation catalysts therefore include tin(II) salts such as tin(II) dioctoate, butyl(II) octoate and other alkyltin(II) octoate compounds, prepared from the corresponding tin(IV) salt using e.g., a trialkyl phosphite, a monoalkyl diaryl phosphite, a dialkyl monoaryl phosphite or a triaryl phosphite. Preferably, the reducing compound is added in the melt of the prepolymer. Addition of the reducing compound at that stage avoids discoloration.

A combination of transesterification catalyst and polycondensation catalyst that may be particularly suitable, is based on a tin(IV) type catalyst during transesterification, which is reduced, preferably with triphenylphosphite and/or tris(nonylphenyl)phosphite, to a tin(II) type catalyst during the polycondensation. The catalysts are used in an amount of about 0.01 to about 0.2 mole % relative to initial diester, more preferably in an amount of about 0.04 to about 0.16 mole % of initial diester.

It is particularly useful that the combination of tin(IV) type catalyst and tin(II) type catalyst retains activity. This allows for the same catalyst to be used for a subsequent solid state polycondensation. Solid state polycondensation (SSP) is a common process used in the preparation of other polyesters, such as PET. In SSP processes, pellets, granules, chips or flakes of polymer are subjected for a certain amount of time to elevated temperatures (below melting point) in a hopper, a tumbling drier or a vertical tube reactor or the like. With tin(IV)/tin(II) catalyst systems, higher molecular weight can be reached than with titanium catalysts. Tin type catalysts allow SSP of the FDCA- or FDCA/NDCA-based polymers to reach a number average molecular weight of 20,000 and greater. Conditions and equipment for SSP are known, in particular as SSP is frequently used to upgrade recycled PET. In applying the SSP process to these polymer systems, the temperature should be elevated relative to traditional SSP processes (as for PET), but nonetheless remain below, and preferably well below, the melting point of the polymer.

Polyesters and various copolymers may be made according to the process described above, depending on the selection of the monomers used. Furthermore, the copolymers may be formed as random or block copolymers depending on the process and process conditions employed. For instance, linear polyesters may be made with FDCA (in the form of its methyl ester) and an aromatic, aliphatic or cycloaliphatic diol. The $C_1$ to $C_{10}$ alkyl diester of FDCA may be used in combination with one or more other dicarboxylic acid esters or lactones. Likewise, the diol may be a combination of two or more diols.

Polyesters that have never been produced before and that are claimed in this application are those having both a 2,5-furan dicarboxylate moiety within the polymer backbone, as well as a 1,3- and 1,4-cyclohexanedimethanol (either of the stereoisomers or a mixture thereof), or 2,2,4, 4-tetramethyl-1,3-cyclobutanediol, or combinations thereof, within the polymer backbone.

The polymers and copolymers according to the current invention need not be linear. If a polyfunctional aromatic, aliphatic or cycloaliphatic alcohol is used, or part of the diol is replaced by such a polyol, then a branched or even crosslinked polymer may be obtained. A branched or crosslinked polymer may also be obtained when part of the FDCA ester or NDCA ester is replaced by an ester of a polyacid. However, branching would reduce barrier properties, and too much crosslinking would impair film processability. As a result, the polymers should have only a moderate degree of branching or crosslinking, or little to essentially no branching or crosslinking, and preferably have no branching or crosslinking.

The diacids and diesters used in the present invention may be FDCA and the $C_1$ to $C_{10}$ alkyl diesters of FDCA, or they comprise FDCA and its diesters, and further comprise NDCA and its $C_1$ to $C_{10}$ alkyl diesters. The polymer may be made with up to 100 mole % of the diacid or diester being FDCA or DMF, or it may be made with as little as 5 mole % of FDCA or DMF. The diacid or diester used to make the polymer may comprise 0.1 to 95 mole % NDCA or DMN and at least 5 mole % of FDCA or DMF. Preferably, the diacid or diester comprises 10-90 mole % FDCA or DMF and 10-90 mole % NDCA or DMN; more preferably 70-80 mole % FDCA or DMF and 20-30 mole % NDCA or DMN.

Other diacids, diesters, lactones or lactides may be present as well. Suitable di- or polycarboxylic acid esters which can be used in combination with the DMF or in combination with DMF and DMN include dimethyl terephthalate, dimethyl isophthalate, dimethyl adipate, dimethyl azelate, dimethyl sebacate, dimethyl dodecanoate, dimethyl 1,4-cyclohexane dicarboxylate, dimethyl maleate, dimethyl succinate, and trimethyl 1,3,5-benzenetricarboxylate.

Preferred examples of dicarboxylic acid esters or polycarboxylic acid esters to be used in combination with the DMF or in combination with DMF and DMN are dimethyl terephthalate, dimethyl adipate, dimethyl maleate, and dimethyl succinate. More preferably, these may be present in a molar ratio of about 10:1 to about 1:10 vis-à-vis the DMF or the combination of DMF and DMN. This mixture of reactants may be referred to as the acid ester reactant.

Preferred examples of lactones to be used in combination with the DMF or in combination with DMF and DMN are pivalolactone, ε-caprolactone and lactides (L,L; D,D; D,L) and glycolide The polymers and copolymers according to the current invention need not be linear. If a polyfunctional aromatic, aliphatic or cycloaliphatic alcohol is used, or part of the dihydroxyl polyol is replaced by a tri- or higher OH-functional polyol, then a branched or even crosslinked polymer may be obtained. A branched or crosslinked polymer may also be obtained when part of the DMF is replaced by an ester of a polyacid. Nevertheless, linear polymer and copolymer are preferred.

The polymers of the present invention are made using polyols which may comprise a mixture of 1,3-cyclohexanedimethanol and 1,4-cyclohexanedimethanol, or 2,2,4,4-tetramethyl-1,3-cyclobutanediol, or combinations thereof. When the polyol is only mixtures of 1,3- and 1,4-cyclohexanedimethanol, or when the polyol comprises mixtures of 1,3- and 1,4-cyclohexanedimethanol, the polyol preferably comprises 25 to 75 mole % of 1,3-cyclohexanedimethanol and 25 to 75 mole % of 1,4-cyclohexanedimethanol, based on the total amount of polyol; more preferably, 45 to 65 mole % of 1,3-cyclohexanedimethanol and 35 to 55 mole % of 1,4-cyclohexanedimethanol, based on the total amount of polyol; and still more preferably, 55 mole % of 1,3-cyclohexanedimethanol and 45 mole % of 1,4-cyclohexanedimethanol, based on the total amount of polyol.

The 1,3- and 1,4-cyclohexanedimethanol generally comprise a mixture of cis- and trans-forms of the molecule. Preferably, both the 1,3-cyclohexanedimethanol and 1,4-cyclohexanedimethanol independently comprise 35 mole % cis- and 65 mole % trans-forms of the molecules.

The polyol used to form the polymers of the present invention may comprises 2,2,4,4-tetramethyl-1,3-cyclobutanediol alone, or in combination with a mixture of 1,3-cyclohexanedimethanol and 1,4-cyclohexanedimethanol, or in combination with other polyol(s).

Examples of suitable polyol monomers which may be used together with mixtures of 1,3-cyclohexanedimethanol and 1,4-cyclohexanedimethanol, or 2,2,4,4-tetramethyl-1,3-cyclobutanediol alone, or combinations of the foregoing, include ethylene glycol, diethylene glycol, 1,2-propanediol, 1,3-propanediol, 1,4-butanediol, 1,5-pentanediol, 1,6-hexanediol, 1,4-benzenedimethanol, 2,2-dimethyl-1,3-propanediol, poly(ethylene glycol), poly(tetrahydofuran), 2,5-di(hydroxymethyl)tetrahydrofuran, isosorbide, glycerol, pentaerythritol, sorbitol, mannitol, erythritol, and threitol. Among those additional polyols which may be used to form the polymers of the present invention (other than mixture of 1,3-cyclohexanedimethanol and 1,4-cyclohexanedimethanol, or 2,2,4,4-tetramethyl-1,3-cyclobutanediol, or combinations thereof), preferred are ethylene glycol, 1,3-propanediol, 1,4-butanediol, 1,6-hexanediol, 2,2-dimethyl-1,3-propanediol, poly(ethylene glycol), and poly(tetrahydofuran).

The FDCA- and FDCA/NDCA-based polymers made by the processes described above, or by other known processes for the preparation of polyesters, can be combined to form novel, useful compositions. The novel polymers may be combined with alternate novel polymers, or with known polyesters, or with both alternate novel polymers and known polyesters. The present invention includes compositions comprising (1) a first polymer comprising reaction product of (a) one or more diacid or diester thereof, and (b) one or more polyol, wherein component (a) comprises 5 to 100 mole %, based on the total amount of component (a), of FDCA, or one or more $C_1$ to $C_{10}$ alkyl diester thereof, and component (b) comprises a mixture of 1,3-cyclohexanedimethanol and 1,4-cyclohexanedimethanol, or 2,2,4,4-tetramethyl-1,3-cyclobutanediol, or combinations thereof; and (2) and one or more second polymer selected from the group consisting of polymers of (1) above different from the first polymer and other polyesters which are reaction product of (i) acids or esters and (ii) polyols, wherein (x) the acids and esters do not include FDCA, $C_1$ to $C_{10}$ alkyl diester thereof, or combinations thereof, when the polyol is a mixture of 1,3-cyclohexanedimethanol and 1,4-cyclohexanedimethanol, or 2,2,4,4-tetramethyl-1,3-cyclobutanediol, or combinations thereof, and (y) wherein the polyols do not include a mixture of 1,3-cyclohexanedimethanol and 1,4-cyclohexanedimethanol, or 2,2,4,4-tetramethyl-1,3-cyclobutanediol, or combinations thereof when the acids and esters are selected from the group consisting of FDCA, $C_1$ to $C_{10}$ alkyl alkyl diester thereof, or combinations thereof. Preferably, this composition comprises two or more polymers, wherein at least one polymer is the reaction product of a diacid and at least one other polymer is the reaction product of a diester.

The composition may comprise one or more other polyester comprising a reaction product of component (i) glycolic acid or glycolide, and component (ii) one or more polyol comprising a mixture of 1,3- and 1,4-cyclohexanedimethanol, or 2,2,4,4-tetramethyl-1,3-cyclobutanediol, or combinations thereof. Since the polyol component contains a mixture of 1,3- and 1,4-cyclohexanedimethanol, or 2,2,4,4-tetramethyl-1,3-cyclobutanediol, it cannot be solely ethylene glycol.

The other polyester used in forming the compositions may be one or more known polyesters, conventional or otherwise, including, but not limited to, aliphatic homopolymer polyglycolide (also known as "polyglycolic acid") (PGA), polylactide (also known as "polylactic acid") (PLA), polycaprolactone (PCL), copolymer polyethylene adipate (PEA), polyhydroxyalkanoate (PHA), polyethylene terephthalate (PET), semi-aromatic copolymer PET, polybutylene terephthalate (PBT), polytrimethylene terephthalate (PTT), polyethylene naphthalate (PEN), and aromatic copolymers from polycondensation of 4-hydroxybenzoic acid and 6-hydroxynaphthalene-2-carboxylic acid.

The invention further includes articles comprising one or more FDCA- or FDCA/NDCA-based polymers, or compositions containing them. The polymers and compositions containing the polymers may contain other components such as plasticizers, softeners, dyes, pigments, antioxidants, stabilizers, fillers and the like. Examples of articles include, but are not limited to, thermoformed articles, film, shrink label, retortable packaging, pipe, bottle, profile, molded article, extruded article, fiber, and fabric. The polymers may be used in forms of application where currently PET, or PEF, or similar polyesters are used.

The invention further includes methods of forming films or sheets comprising the steps of (i) extruding a polymer to form an extrudate; (ii) shaping the extrudate by passing it through a flat or annular die; and (iii) cooling the extrudate to form a film or sheet having a machine direction and a cross direction; wherein the polymer comprises reaction product of (a) one or more diacid or diester thereof, and (b) one or more polyol, wherein component (a) comprises 5 to 100 mole %, based on the total amount of component (a), of furan dicarboxylic acid, or one or more $C_1$ to $C_{10}$ alkyl diester thereof, and component (b) comprises a mixture of 1,3- and 1,4-cyclohexanedimethanol, or 2,2,4,4-tetramethyl-1,3-cyclobutanediol, or combinations thereof. The method may comprise the further step of orienting the film or sheet in the machine or cross direction, or both. The polymer resin may be processed according to standard processes applicable to other polyesters such as PET and PEF. When the resulting film or sheet is oriented in both the machine and cross directions, such orientation may be imparted sequentially or simultaneously. The barrier film thickness typically ranges from 1 μm to 350 μm.

The invention further includes a film or sheet of one or more layers, wherein at least one layer comprises polymer comprising the reaction product of (a) one or more diacid or diester thereof, and (b) one or more polyol, wherein component (a) comprises 5 to 100 mole %, based on the total amount of component (a), of 2,5-furan dicarboxylic acid, or one or more $C_1$ to $C_{10}$ alkyl diester thereof, and component (b) comprises a mixture of 1,3-cyclohexanedimethanol and 1,4-cyclohexanedimethanol, or 2,2,4,4-tetramethyl-1,3-cyclobutanediol, or combinations thereof. Such multilayer films may be prepared according to standard processes applicable to other polyesters such as PET and PEF.

Films and resins made from the polymers and compositions of the present invention exhibit a desirable balance of properties, relative to PEF polymers, including improved oxygen, carbon dioxide, and water-vapor permeabilities, higher glass transition temperature (Tg), and improved chemical, heat and impact resistance. In addition, these polymers can used to form films with high-temperature heat sealability using alternative sealing technologies.

These films and resins may be used for various applications which benefit from the combination of properties described above, such as shrink labels, bottles for beverages and other fluids, high-barrier film applications for conventional (i.e., for use in less demanding applications than retort) and retortable packaging, hot-fill packaging, and high-heat (i.e., dry heat) applications, such as oven-proof packaging. These films and resins can be used to form packaging for applications generally served by PET films without the need for additional barriers layers needed with PET-based systems. At similar thicknesses as PET food packaging films, the films and resins of the present invention can be used for long shelf-life packaging for food products and pharmaceuticals, or alternatively can be used at down-gauged levels for food packaging and pharmaceuticals with performance comparable to conventional (but thicker) PET-based systems. These films and resins can be used to form transparent packaging that can provide UV-blocking for food, pharmaceutical and other applications.

The polymer can also be used in tape applications, such as the carrier for magnetic tape or backing for pressure sensitive adhesive tapes, for packaging trays and blister packs. The polymer can also be used as substrate in thin film and solar cell applications.

The polymer may be used formed into injection molded articles, extruded sheets, profile extruded articles and extruded blow molded articles. The polymers may be used in applications including, but not limited to, medical packaging, shrink labels, rigid laminates (e.g., for furniture), transaction cards (e.g., credit cards), bottles (including so-called clear handleware), housewares, appliances, equipment, and signage.

Films and resins of the present invention can be used to form multilayer packaging systems. Because of the high barrier properties (vis-à-vis oxygen, $CO_2$ and moisture), such multilayer systems can be made without metal foil or metalized polymeric film layers. This enables the construction of transparent or substantially transparent packaging films, a desirable opportunity for marketing food and other products. For example, the invention barrier films may comprise a polyester-based polymer with (a) an $O_2$ gas permeability of 0.4 cc-mil/100 in.$^2$ 24 hrs atm (7.9 cc 20 μm/m$^2$ 24 hrs atm) at 50% relative humidity (ASTM D-3985) or less, (b) a moisture permeability of 0.5 g mil/100 in.$^2$ 24 hrs atm (9.8 g 20 μm/m$^2$ 24 hrs atm) at 38° C. (ASTM F-1249) or less, and (c) a glass transition temperature (Tg) of 100° C. or higher. The barrier film may further have (x) a Falling dart drop impact (Type A) of 200 g for a 50 μm thick film material at room temperature and 50% relative humidity (ASTM D-1709) or greater, (y) an Elmendorf tear of 400 g for a 50 μm thick film material at room temperature and 50% relative humidity (ASTM D-1922) or greater, or (z) a notched Izod impact of 1.0 J/cm at room temperature and 50% relative humidity (ASTM D-256 for rigid materials) or greater, or combinations thereof. Preferably, the film has properties (a), (b) and (c), and one or more of properties (x), (y) and (z). Such polymers are particularly suitable for food, industrial, consumer, pharmaceutical, medical, and electronic and electronic component packaging applications.

The barrier films may preferably comprise a polyester-based polymer with (a) an $O_2$ gas permeability of 2.5 or less, 2 or less, 1 or less, or 0.5 cc-mil/100 in.$^2$ 24 hrs atm (5 or less, 4 or less, 2 or less, or 1 or less cc 20 μm/m$^2$ 24 hrs atm) at 50% relative humidity, (b) a moisture permeability of 0.3 or less, 0.2 or less, or 0.1 g mil/100 in.$^2$ 24 hrs atm (6 or less, 4 or less, or 2 or less g 20 μm/m$^2$ 24 hrs atm at 38° C.), and (c) a Tg of 110° C. or higher, or 120° C. or higher, or 100 to 150° C., or 110 to 150° C., or 120 to 150° C.

The barrier film may preferably have (x) a Falling dart drop impact (Type A) of 250 or greater, or 300 or greater, or 500 g or greater for a 50 μm thick film material at room temperature and 50% relative humidity, (y) an Elmendorf tear of 450 or greater, 500 or greater, or 600 g or greater at room temperature and 50% relative humidity, or (z) a notched Izod impact of 1.5 or greater, or 2.0 or greater, or 2.5 or greater, or 3.0 J/cm or greater at room temperature and 50% relative humidity, or combinations of (x), (y) and (z).

Each of the various figures for the barrier, Tg and toughness properties described in the preceding three paragraphs may be independently combined to describe films within the scope of the present invention. Merely as an illustration of that point, as one example, the barrier film of the present invention may comprise a polyester-based polymer with (a) an $O_2$ gas permeability of 2.5 cc-mil/100 in.$^2$ 24 hrs atm (5 cc 20 μm/m$^2$ 24 hrs atm) or less at 50% relative humidity, (b) a moisture permeability of 0.5 g mil/100 in.$^2$ 24 hrs atm (9.8 g 20 μm/m$^2$ 24 hrs atm) or less at 38° C., and (c) a Tg of 120° C. or higher; and that barrier film may further have (x) a Falling dart drop impact (Type A) of 250 g or greater for a 50 μm thick film material at room temperature and 50% relative humidity, (y) an Elmendorf tear of 600 g or greater at room temperature and 50% relative humidity, and (z) a notched Izod impact of 3 J/cm or greater at room temperature and 50% relative humidity. This illustrates the point that the barrier film may satisfy any combination of the stated measures for properties (a), (b) and (c), and that it may comprise those properties alone or further in combination with one or more of the properties (x), (y) or (z), and any combination of the stated properties for properties (x), (y) and (z).

The polymer may form a film with similar or lesser barrier properties as described above, but with one or more of the following properties indicating toughness: (a) a Falling dart drop impact (Type A) of 200 g for a 50 μm thick film material at room temperature and 50% relative humidity (ASTM D1709) or greater;
(b) an Elmendorf tear of 400 g for a 50 μm thick film material at room temperature and 50% relative humidity (ASTM D-1922) or greater; or
(c) a notched Izod impact of 1.0 J/cm at room temperature and 50% relative humidity (ASTM D-256 for rigid materials) or greater; or combinations thereof.

The following examples illustrate the present invention.

EXAMPLES

A typical synthesis procedure could be as follows:

DMF (2,5-dimethyl furandicarboxylate), the selected diol and ethylene glycol are charged into a reactor with vigorous mixing in presence of a catalyst like monobutyltin oxide and titanium n-butoxide under nitrogen. The temperature of the contents is slowly increased to 160° C. and kept at that temperature for about an hour while collecting methanol through a side-arm attached to vacuum. The temperature is then increased to 170° C. for an hour, followed by at 185° C. for two hours. The vacuum is slowly applied and is reduced to about 1 bar over about 1 hour or more. Finally, the temperature is further increased to 230° C. for about 4 hrs, followed by cooling to about ambient temperature.

| Example | Diacid/ Diester | Required Polyol | Other Polyol | Equivalent % Ethylene glycol in polyol blend |
|---|---|---|---|---|
| 1 | DMF | 2,2,4,4-tetra-methyl-1,3-cyclobutanediol | Ethylene glycol | 50 |
| 2 | DMF | 1,3-/1,4-cyclohexane-dimethanol | Ethylene glycol | 25 |
| 3 | DMF/DMN (1:1 equivalent ratio) | 2,2,4,4-tetra-methyl-1,3-cyclobutanediol | Ethylene glycol | 50 |
| 4 | DMF/NDCA (1:1 equivalent ratio) | 2,2,4,4-tetra-methyl-1,3-cyclobutanediol & 1,3-/1,4-cyclohexane-dimethanol (1:1 equiv ratio) | Ethylene glycol | 50 |
| Comp. | DMF | | Ethylene Glycol | |

The comparative example incorporates only DMF and excess ethylene glycol in the process of the above example.
Analytical: MW Measurements:
HPLC by Waters.
Detector: A differential refractometer
Eluent: A 5-Mm solution of sodium trifluoroacetate in hexafluoroisopropanol
Flow rate: 1.0 ml/min
Column Temperature: 40° C.
Standard: Polymethyl methacrylate (PMMA) resin.
Forming the Film
The polyester-based polymers with the compositions as described in the preparations above may be formed into barrier films as follows:
 the polymer is sufficiently dried and extruded onto casting drum (provides smooth surface to plastic film).
 the resulting film is stretched 2 to 7 times in both the forward and transverse directions, either in a simultaneous process or sequentially
 Sequential Draw process: the film's forward draw is over a series of precision motorized rollers; transverse or sideways draw uses diverging clips in a multiple zoned oven with tightly controlled temperatures
 Simultaneous Draw process: the film is drawn using precision controlled simultaneously diverging, and accelerating clips through a multiple zoned oven with tightly controlled temperatures
 tension and temperatures are maintained properly to ensure final quality of the film
 the film is wound into large master rolls, which can optionally be slit to precision widths
 the film thickness typically ranges from 1 μm to 350 μm.

What is claimed is:

1. A polymer comprising reaction product of (a) one or more diacid or diester thereof, and (b) one or more polyol, wherein component (a) comprises 5 to 100 mole %, based on the total amount of component (a), of 2,5-furan dicarboxylic acid (FDCA), or one or more $C_1$ to $C_{10}$ alkyl diester thereof, and component (b) comprises 55-65 mole %, based on the total amount of component (b), of 1,3-cyclohexanedimethanol and 35-45 mole %, based on the total amount of component (b), of 1,4-cyclohexanedimethanol.

2. The polymer of claim 1 wherein component (a) comprises dimethyl furanoate (DMF).

3. The polymer of claim 1 wherein component (a) further comprises 0.1 to 95 mole %, based on the total amount of component (a), of 2,6-naphthalene dicarboxylic acid (NDCA), one or more $C_1$ to $C_{10}$ alkyl diester thereof.

4. The polymer of claim 3 wherein component (a) comprises dimethyl naphthanoate (DMN).

5. The polymer of claim 3 wherein component (a) comprises 10 to 90 mole % of FDCA and 90 to 10 mole % of NDCA, based on the total amount of component (a).

6. The polymer of claim 3 wherein component (a) comprises 10 to 90 mole % of one or more $C_1$ to $C_{10}$ alkyl diester of FDCA and 90 to 10 mole % of one or more $C_1$ to $C_{10}$ alkyl diester of NDCA, based on the total amount of component (a).

7. A composition comprising:
 (1) a first polymer of claim 1 and
 (2) one or more second polymer selected from the group consisting of:
  (A) polymers of claim 1 different from the first polymer, and
  (B) other polyesters which are reaction product of (i) acids or esters and (ii) polyols,
  wherein:
   (x) the acids and esters do not include FDCA, $C_1$ to $C_{10}$ alkyl diester thereof, or combinations thereof, when the polyol is a mixture of 1,3-cyclohexanedimethanol and 1,4-cyclohexanedimethanol, or 2,2,4,4-tetramethyl-1,3-cyclobutanediol, or combinations thereof, and
   (y) the polyols do not include a mixture of 1,3-cyclohexanedimethanol and 1,4-cyclohexanedimethanol, or 2,2,4,4-tetramethyl-1,3-cyclobutanediol, or combinations thereof when the acids and esters are selected from the group consisting of FDCA, $C_1$ to $C_{10}$ alkyl diester thereof, or combinations thereof.

8. The composition comprising two or more polymers of claim 7, wherein at least one polymer is the reaction product of a diacid and at least one other polymer is the reaction product of a diester.

9. The composition of claim 7, wherein the other polyester comprises a reaction product of component (i) glycolic acid or glycolide, and component (ii) one or more polyol comprising a mixture of 1,3-cyclohexanedimethanol and 1,4-cyclohexanedimethanol, or 2,2,4,4-tetramethyl-1,3-cyclobutanediol, or combinations thereof.

10. The composition of claim 7, wherein the other polyester comprises aliphatic homopolymer polyglycolide or polyglycolic acid (PGA), polylactide or polylactic acid (PLA), polycaprolactone (PCL), copolymer polyethylene adipate (PEA), polyhydroxyalkanoate (PHA), polyethylene terephthalate (PET), semi-aromatic copolymer PET, polybutylene terephthalate (PBT), polytrimethylene terephthalate (PTT), polyethylene naphthalate (PEN), and aromatic copolymers from polycondensation of 4-hydroxybenzoic acid and 6-hydroxynaphthalene-2-carboxylic acid.

11. An article comprising one or more polymers of claim 1.

12. A method of forming a film or sheet comprising:
 (i) extruding the polymer of claim 1 to form an extrudate;
 (ii) shaping the extrudate by passing it through a flat or annular die; and
 (iii) cooling the extrudate to form a film or sheet having a machine direction and a cross direction.

13. The method of claim 12 comprising the further step of orienting the film or sheet in the machine or cross direction, or both.

14. A film or sheet having one or more layers, wherein at least one layer comprises the polymer of claim 1.

* * * * *